July 10, 1956
C. R. LIBECAP
2,753,576
MEAT BLOCK CLEANER
Filed Aug. 17, 1953
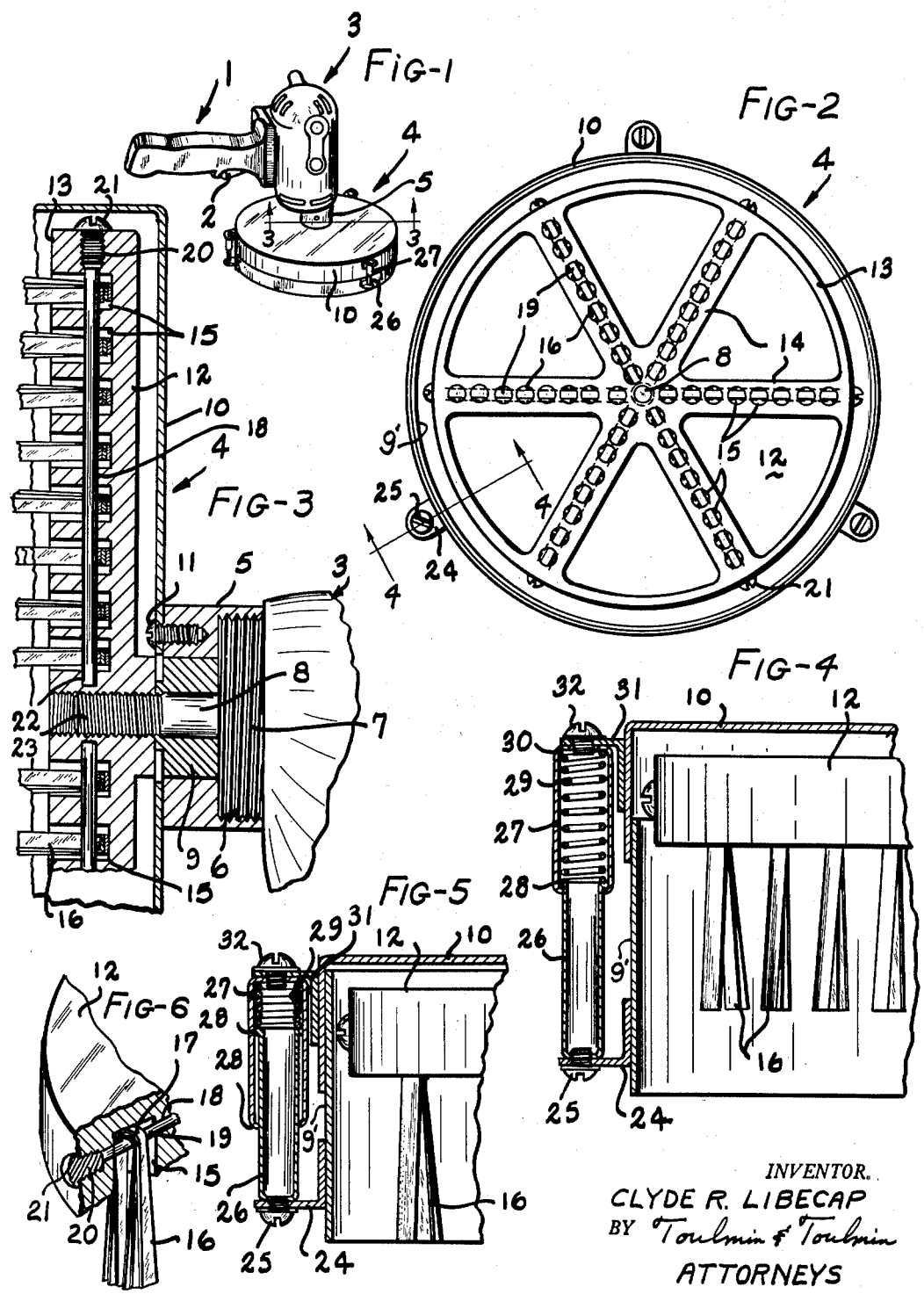
INVENTOR.
CLYDE R. LIBECAP
BY Toulmin & Toulmin
ATTORNEYS

United States Patent Office 2,753,576
Patented July 10, 1956

2,753,576

MEAT BLOCK CLEANER

Clyde Roy Libecap, Brookville, Ohio

Application August 17, 1953, Serial No. 374,474

2 Claims. (Cl. 15—93)

The present invention relates to appurtenances used in the sale of meats, and more particularly to devices for cleaning meat blocks.

The heavy wooden blocks on which the meat is cut for retail have to be scrubbed frequently for sanitary and other reasons, and for this purpose stiff wire brushes are used. These brushes are moved rapidly back and forth across the block and pressed downwardly so that the work of cleaning the blocks becomes tedious and not altogether satisfactory because the brushing action tends to wear the block unevenly. These brushes are usually constituted of wire bristles and when the latter fall out or become worn, the entire brush usually has to be discarded.

The primary object of the invention is to provide an improved meat block cleaner which is relatively easy to operate and which also provides a circulatory scouring action to maintain a smooth surface on the block.

Another object is to provide a meat block cleaner which can be pressed downwardly onto the block, the more rapidly to effect the cleaning operation and without any extra work on the operator except for the downward pressure.

Still another object is to provide a meat block cleaner of a power rotary type in which the cleaner is adapted to operate on meat blocks of all shapes and sizes with optimum results.

A further object is to provide a meat block cleaner of the steel bristle type but which is inexpensive to make, easy to operate, and in which the bristles can be quickly replaced when worn.

A still further object is to provide a meat block cleaner in which the particles of wood or extraneous matter on the surface of the block are prevented from leaving that surface until the scrubbing action has been completed.

Another object is to provide a meat block cleaner in which a spring action is furnished against the scouring action of the brushes so as to impart longer life to the cleaner as a whole.

Other objects and features will be apparent as the specification is perused in connection with the accompanying drawings, in which:

Figure 1 is a perspective view, in diminutive size, of the improved meat block cleaner;

Figure 2 represents a bottom plan enlarged view of the cleaner;

Figure 3 is a fragmentary, considerably enlarged sectional view, taken along line 3—3 in Figure 1, and showing the details of the motor mounting and the bristle assembly;

Figure 4 is a fragmentary vertical sectional view showing the details of the spring mechanism between the circular guard and the main cleaner member; this view is taken at about line 4—4 in Figure 2, looking in the direction of the arrows;

Figure 5 is a view similar to Figure 4 except that it shows the circular guard being forced upwardly so as to expose the bristle units when pressure is applied to the meat block cleaner; and Figure 6 is a greatly enlarged fragmentary perspective view of one of the bristle units, particularly showing the manner in which these units are detachably secured to the rotor.

Referring to Figure 1, the improved meat block cleaner comprises three main parts; the part generally designated by reference character 1 constituting a handle with a lift-up switch 2; the part indicated at 3 constituting a motor energizable either on alternating or direct current of standard voltage; and part 4 constituting the cleaner element itself.

There is a protective collar 5 which positions the bottom of the motor from the top of the cleaner, this collar having a threaded opening 6 which receives the threads of extension 7 projecting from the base of the motor. If the motor normally turns clockwise, as looking down on top of the motor, these threads are preferably left-hand so that any slight gyrations or vibrations of the motor would not tend to loosen the threads 7.

A shaft 8 is taken from the armature of the motor and there is a spacer collar 9 surrounding the shaft contained within the collar 5. The switch 2 is connected in the wiring of the motor so as to control the on and off conditions.

The meat block cleaner element is constituted essentially of a cup-shaped metal member 10, preferably made of aluminum, and is screwed as indicated at 11 to the collar 5. Within this cup-shaped member there is the rotor proper 12, preferably cast or otherwise made of aluminum of considerable thickness, as indicated, and having an annular lip 13, also of heavy thickness.

There are a number, six as illustrated, of webs or ridges 14 extending radially inward from the lip 13 and merging at the center. Openings 15 are counter-bored in these webs to any suitable depth, these openings being adapted to receive the bristles of the cleaner. As shown in Figure 6, each opening preferably contains three pairs of spring metal strips 16, these strips being bent as indicated at 17 on themselves by removing the temper at that point. It is apparent that the openings are of such diameter and the strips 16 are of such width that the openings snugly receive the strips. The latter constitute the bristles as spines of the brush cleaner and they are so arranged that the flat sides of these bristles extend in the same direction as the webs and are of substantially the same length.

In order detachably to hold the bristles or metal strips in place, openings 18 are provided from the peripheral surface of the lip 13 along each web, practically as far as the center. Within this opening there is a rod 19 which fits snugly within the bent portions of the strips 16 and tends to clamp these strips against the bottom of the openings 15, as can be seen more clearly in Figure 6. The rods 19 terminate at their outer ends in an enlarged threaded portion 20 with a screw head 21, the screw serving to hold the rods securely in place at one end, and these rods fit into openings 22 in the hub or center portion of the webs.

It is obvious that in order to remove any one of the strips 16 or any strip unit or units, it is merely necessary to remove the rotor from the cup-shaped member 10 and then unscrew the rods 19 at the head 21. The rotor is detachably secured to the motor shaft 8 by the threaded end 23 so that it is a very simple matter to remove the rotor from the member 10.

It is obvious that when the motor 3 is energized and running at fairly high speed, the lower ends of the bristles 16 tend to lightly shave the meat block and to remove any meat particles thereon and these particles would normally fly out from the rotating rotor in all directions. In order to confine these particles to a position within the confines of the meat block cleaner, I provide the slidable sleeve or cylinder 9′ which is adapted to be forced upwardly by the action of the meat block when downward pressure is applied to the handle 1 and the motor 3.

This sleeve is carried on three or more angle brackets 24, fastened in any suitable manner to the lower edge of the sleeve, and there is a screw 25 passing through the bracket which secures an upwardly extending hollow column 26. This column is adapted to slidably move up and down within a tubular member 27 of larger diameter than the column 26 and these two members are slidably secured together at the gripping flanges 28.

There is a compression spring 29 within the tubular member 27 bearing against the closed end 30 of that member and this end is secured to a bracket 31 by means of a screw 32. The bracket is fastened in any suitable manner to the skirt portion of the cap member 10.

In Figure 4 the spring 29, of which there are preferably three around the sleeve 9′, is shown in an extended position, causing the sleeve to be positioned beyond the lower ends of the strips 16. But when pressure is applied to the member 10 by pressing down on the handle 1, as seen in Figure 5, the sleeve 9′ recedes into the annular circumferential portion of the member 10, as seen in Figure 5, to expose the lower ends of the strip 16 to the meat block.

Thus, during operation, when pressure is applied to the cleaner against the meat block, the rotor, in moving the strips over the surface of the block, will scour or scrub the block clean of any meat or foreign particles and these particles will be caught by the slidable sleeve or shield member 9′ which is continually being urged downwardly by the springs 29. This resiliency of movement between the rotor 12 and the lower edge of the sleeve 9′ tends to provide an evenness of the cutting or scraping effect caused by the strips or bristles 16 so that the block is left in a perfectly smooth and clean condition.

It is obvious that since the sleeve or shield 9′ recedes, on downward pressure being applied to the cleaner, to a position which is on level with the lowermost cutting edges of the strips 16, the cleaner can be used in connection with rectangular or circular meat blocks, or any other shape, as the shield 9′ introduces no limitations in the movements of the cleaner.

The spring elements 26, 27 and 29 can be readily removed as a unit for replacement or repair by simply removing the screws 25, 32 so that all parts of the meat block cleaner are readily replaceable with minimum effort, thus assuring long life to the cleaner as a whole.

It will be understood that various modifications and arrangements in structure could be made without departing from the spirt of my invention and, accordingly, I desire to comprehend such modifications and substitutions of equivalents as may be considered to come within the scope of the appended claims.

Having thus fully described my invention, what I claim as new and desire to secure by Letters Patent, is:

1. A meat block cleaner comprising a circular plate adapted to rotate, bristles arranged across said plate and extending in a direction normal thereto, a two-part telescoping member comprising an upper and lower portion enclosing said plate and bristles, said upper portion comprising an inverted cup-shaped member extending over the plate and said lower portion comprising an annular member slidably fitted within said cup-shaped member and adapted to extend ordinarily beyond the operating ends of said bristles, a plurality of spring-actuated tubular members spacedly arranged about and exteriorly of said telescoping member which are removably secured to said inverted cup-shaped member, said tubular members having a closed upper end and open lower end portion, compression spring disposed in said tubular members and in abutting engagement with the respective closed end portions thereof, plungers arranged in line with said tubular members and having their respective upper ends slidably engaging in said tubular members and moving against and compressing said springs when said cleaner is supported on a meat block surface to be cleaned and pressed thereagainst, said plungers being removably secured at their respective lower ends to said annular member whereby said spring-actuated members may be readily removed as a unit for replacement or repair.

2. A meat block cleaner comprising a circular plate adapted to rotate, bristles arranged across said plate and extending in a direction normal thereto, a two-part telescoping member comprising an upper and lower portion enclosing said plate and bristles, said upper portion comprising an inverted cup-shaped member extending over the plate and said lower portion comprising an annular member slidably fitted within said cup-shaped member and adapted to extend ordinarily beyond the operating ends of said bristles, a plurality of spring-actuated members spacedly arranged about and exteriorly of said telescoping member, bracket means fixed to the outer surface side wall of said inverted cup-shaped member, removable means for attaching said tubular members to said bracket means, said tubular members having a closed end portion, compression springs disposed in said tubular members and in abutting engagement with the respective closed end portions thereof, plungers arranged in line with said tubular members and having their respective upper ends slidably engaging in said tubular members and moving against and compressing said springs when said cleaner is supported on a meat block surface to be cleaned and pressed thereagainst, said plungers being removably secured at their respective lower ends to said annular member whereby said spring-actuated members may be readily removed as a unit for replacement or repair.

References Cited in the file of this patent

UNITED STATES PATENTS

| | | |
|---|---|---|
| 1,643,882 | Faiver | Sept. 27, 1927 |
| 1,768,942 | Szewczyk | July 1, 1930 |
| 1,796,700 | Ardron | Mar. 17, 1931 |
| 2,178,169 | Goertzen | Oct. 31, 1939 |
| 2,250,177 | Boccasile | July 22, 1941 |
| 2,306,470 | Rush | Dec. 29, 1942 |
| 2,504,643 | Burgoon | Apr. 18, 1950 |
| 2,668,968 | Dobrowolski | Feb. 16, 1954 |